United States Patent
Kunze et al.

(10) Patent No.: US 11,619,812 B2
(45) Date of Patent: Apr. 4, 2023

(54) OPERATING A HEAD-UP DISPLAY WITH OBJECTS THAT CAN BE SHOWN LOCATED OUTSIDE A FIELD OF VIEW

(71) Applicant: Volkswagen Aktiengesellschaft, Wolfsburg (DE)

(72) Inventors: Alexander Kunze, Berlin (DE); Ulrich Wuttke, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 17/487,973

(22) Filed: Sep. 28, 2021

(65) Prior Publication Data
US 2022/0099969 A1    Mar. 31, 2022

(30) Foreign Application Priority Data
Sep. 30, 2020    (DE) .......................... 102020212412.4

(51) Int. Cl.
  *G02B 27/01*    (2006.01)
  *B60K 35/00*    (2006.01)
  *G06T 19/00*    (2011.01)

(52) U.S. Cl.
  CPC .......... *G02B 27/0101* (2013.01); *B60K 35/00* (2013.01); *G06T 19/006* (2013.01);
  (Continued)

(58) Field of Classification Search
  CPC ........ G02B 27/0101; G02B 2027/0123; G02B 2027/014; G02B 27/01; B60K 35/00;
  (Continued)

(56) References Cited

U.S. PATENT DOCUMENTS

2015/0091780 A1*  4/2015  Lyren .................. G02B 27/017
                                                               345/8
2019/0043392 A1    2/2019  Abele

FOREIGN PATENT DOCUMENTS

DE    102015222844 A1    5/2017
DE    102019206490 B3    3/2020
(Continued)

OTHER PUBLICATIONS

Renate Häuslschmid et al., Augmenting the Driver's View with Peripheral Information on a Windshield Display, Mar. 2015, IUI 2015, In Proceedings of the 20th International Conference on Intelligent User Interfaces, pp. 311-321. (Year: 2015).*

(Continued)

*Primary Examiner* — Jeffery A Brier
(74) *Attorney, Agent, or Firm* — Loza & Loza, LLP; Peter Zura

(57) ABSTRACT

A head-up display and techniques for operating a head-up display for a motor vehicle. An assignment is obtained of at least one virtual object that can be displayed to a part of the environment. The head-up display may be operated in a normal display mode when the object assigned to the part of the environment is within a field of view for the head-up display. The head-up display is then operated in an alternative display mode when the object assigned to the part of the environment is not, or not entirely, contained within the field of view for the head-up display, wherein a virtual display is generated in the alternative display mode.

19 Claims, 4 Drawing Sheets

(52) U.S. Cl.
CPC ............ *B60K 2370/1529* (2019.05); *G02B 2027/014* (2013.01); *G02B 2027/0123* (2013.01)

(58) Field of Classification Search
CPC ...... B60K 2370/1529; B60K 2370/177; B60K 2370/193; G06T 19/006; G08G 1/09623; G08G 1/096861; G08G 1/16; G01C 21/365
See application file for complete search history.

(56) References Cited

FOREIGN PATENT DOCUMENTS

| | | | |
|---|---|---|---|
| FR | 3060774 A1 | 6/2018 | |
| JP | 2020132137 A * | 8/2020 | ............ B60K 35/00 |
| JP | 2020132137 A | 8/2020 | |

OTHER PUBLICATIONS

Thomas W. Frey and H. Jean Page, Virtual HUD using an HMD, Aug. 2001, SPIE, In Helmet—and Head-Mounted Displays VI, vol. 4361, pp. 251-262. (Year: 2001).*
EP 21195605.7. Extended EP Search Report (Feb. 11, 2022).

* cited by examiner

OPERATING A HEAD-UP DISPLAY WITH OBJECTS THAT CAN BE SHOWN LOCATED OUTSIDE A FIELD OF VIEW

CROSS REFERENCE TO RELATED APPLICATION

The present application claims priority to German Patent Application No. DE 10 2020 212 412.4, to Kunze, et al., filed Sep. 30, 2020, the contents of which is incorporated by reference in its entirety herein.

FIELD OF TECHNOLOGY

The present disclosure relates to a method for operating a head-up display, wherein the head-up display is configured for a motor vehicle. The motor vehicle can be an automobile or a truck, for example.

BACKGROUND

Head-up displays (HUDs) for showing virtual objects, or, in other words, virtual content in a driver's field of view is known in the automotive industry. From the perspective of the driver, the virtual objects are superimposed on the environment. These objects can be displayed in the known manner on the inside of a windscreen, e.g., by projecting the objects thereon. Separate projection surfaces, and transparent projection screens in particular, on which the objects are projected, are also known. The technological background for head-up displays in general is disclosed, e.g., in US 2019/0043392 A1 and FR 3 060 774 A1.

A head-up display with expanded reality is known from DE 10 2019 206 490 B3. Graphics are shown thereon as a function of the distance of the motor vehicle to an object in the environment of the motor vehicle.

To be able to show the objects as reliably as possible, and plan in an anticipatory manner, it is known to regard or generate virtual models of a motor vehicle's environment.

Virtual objects that can be shown are assigned to specific parts of a vehicle's environment, such that they are positioned in the model of the environment. As soon as these objects, or the part of the environment to which they are assigned, enter the field of view of the head-up display, or overlap such a field of view, or overlay it, the objects can be shown. From the perspective of the driver, the objects are then shown in the correct position, and/or anchored to a location within the environment.

Objects can also be assigned to real regions in the environment (and modeled with regard to a model of the environment, for example), and they can also be depicted in relation to the location and/or in perspective, and in particular in three dimensions. This is typical for expanded reality head-up displays. Such objects can also be referred to as contact-analog objects or display elements. This can relate to highlighting real objects in the environment (e.g., by framing them), such as traffic signs. These objects can also be navigation instructions, e.g., turning arrows, or arrows indicating the direction of travel in general, which are assigned to specific roadways or intersections, for example. General instructions that are not necessarily assigned to a specific object in the environment, but only refer to a certain part of the environment, can also be shown. These can be warnings such as a symbol for icy conditions or speed limits, for example. This information can be assigned to specific parts of the environment in an environment model, and be displayed when the motor vehicle enters this region and/or the part of the environment is within the field of view.

It has been realized that this approach does not yet succeed in the desired manner at present. For one thing, the display thereof within the field of view may be late from the perspective of the driver if it first takes place when the object in question and/or the associated part of the environment lies directly within the field of view of the head-up display. It may also be the case that a driver displaces the field of view such that what are consider to be important objects (e.g., navigation instructions) that are linked to a real location in the environment (e.g., the center of an intersection) do not overlap the field of view at all while driving. In this case, the driver may overlook them entirely. There are various ways for a driver to adjust a field of view in a head-up display (e.g., directly or indirectly by varying the so-called "Eye-Box") that are known in the prior art.

There is therefore a desire for a more reliable displaying of objects in a head-up display, in particular when objects are assigned to regions of the vehicle's environment.

SUMMARY

In general, a head-up display is disclosed to be operated in accordance with different operating modes. In a normal display mode, the head-up display can be operating in the conventional manner, and then show an object assigned to a part of the environment when this specific part of the environment lies within a field of view of the head-up display. The object is preferably depicted three dimensionally and/or in perspective. In particular, the object is preferably superimposed on the part of the environment it relates to from the driver's perspective, thus appearing as part of the environment in the upcoming direction of travel. These depictions are known in theory, and can take place using so-called augmented reality head-up displays of the type described above. The head-up display presented herein can therefore be such an expanded reality head-up display and/or be configured in general for showing expanded reality objects, e.g., through a perspective and/or three-dimensional depiction and/or location-specific display with a corresponding location-specific superimposing thereof on reality.

The present disclosure also provides that an object assigned to a part of the environment is displayed, or used to activate the normal display mode and/or alternative display mode. As such, numerous objects that can be displayed in theory may be detected in a model of the environment, e.g., depending on a route selected by a driver or a route that appears to be probable. Only the object that is anticipated to be the next one to be shown, e.g., the object closest to the motor vehicle, or belonging to a part of the environment that is closest to the motor vehicle, is then preferably regarded. As a result, it is possible to reliably determine which of the objects that can be shown should be regarded for selecting the normal display mode or the alternative display mode, i.e., that should be decisive for which of these modes is to be activated. The display can still show objects and information that are not location-specific independently thereof, which are not assigned to specific parts of the environment, for example.

In some examples, technologies and techniques are disclosed for operating an expanded-reality head-up display for a motor vehicle that includes obtaining an assignment of a virtual object that can be displayed to a part of the environment; operating the head-up display in a normal display mode when the object assigned to the part of the environment is located in a field of view for the head-up display;

operating the head-up display in an alternative display mode when the object assigned to the part of the environment is not, or not entirely, located in a field of view for the head-up display, wherein a virtual display is generated in the alternative display mode.

BRIEF DESCRIPTION OF THE DRAWINGS

Exemplary embodiments of the invention shall be explained below on the basis of the following schematic drawings. Therein.

DETAILED DESCRIPTION

Figure 1:
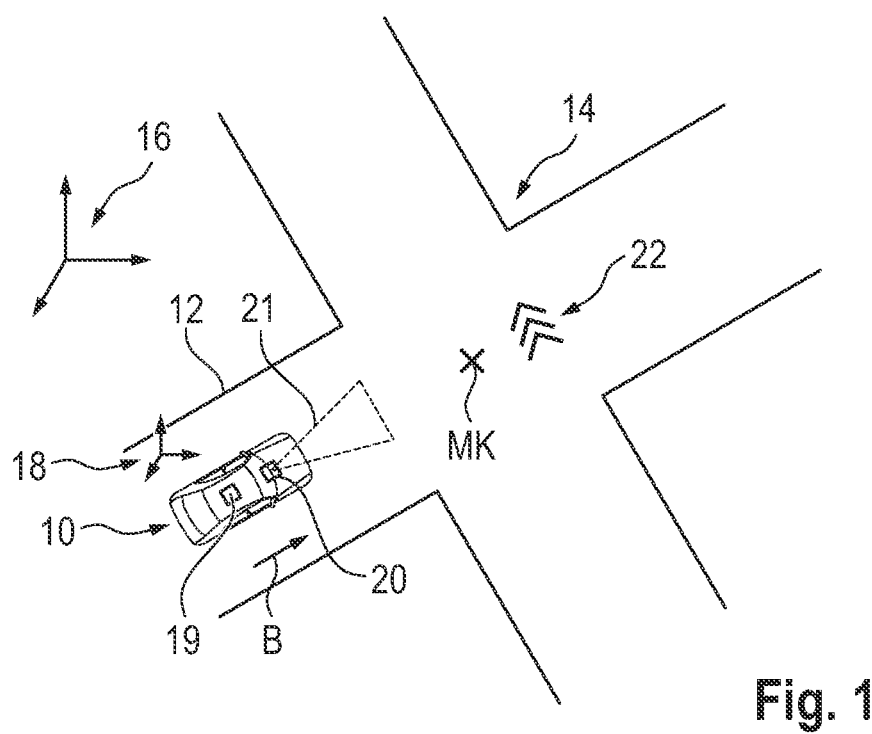
FIG. 1 shows a motor vehicle comprising a head-up display according to an exemplary embodiment with which a method according to an exemplary embodiment is executed while motor vehicle approaches an intersection.

In some examples, numerous virtual objects that can be displayed can be assigned to a part of the environment, but they are then preferably assigned to individual parts of the environment. As explained herein, preferably only one of these objects is then regarded, in particular the object in theory that is to be displayed next (e.g., the next object to be displayed next along a route for the motor vehicle), for choosing between the various display modes.

Measures may also be determined for determining whether or not the object overlaps the field of view (or is located therein). One of the aforementioned display modes can then be selected according to the results of these measures. The assigning of objects to parts of the environment can also be part of the process.

In some examples, assigning virtual objects to part of the environment can take place virtually, e.g., with a corresponding placement in a database, and/or associating or assigning coordinates in the environment to the virtual object. In particular, the virtual object can be placed virtually in or on the part of the environment, e.g., in a model of the environment. This can also mean that the object can be assigned corresponding coordinates in the environment in the model of the environment or its coordinate system. In other words, the object can be clearly located and/or positioned in the model of the environment through a corresponding assignment thereto.

In some examples, the part of the environment can also be purely virtual. It can thus correspond to an area in the model of the environment, including a corresponding number of points or coordinates. It can be explicitly assigned to a real part of the environment, and/or correspond thereto.

A position of the motor vehicle can be determined in the model of the environment, for example, on the basis of positioning systems, such as a GPS-based positioning system. Determination of the orientation of a field of view in a head-up display, for example, in a motor vehicle coordinate system, is also known. This field of view can be a field, area, or region in general in which objects can be shown with the head-up display, and projected therein in particular. The position of the field of view within the motor vehicle can be determined on the basis of where the head-up display is installed in the motor vehicle, and/or on the basis of settings of optical components in the head-up display in particular, as long as can be varied by the driver, e.g., for varying an EyeBox.

The position of the field of view can then be determined within the model of the environment from a known relative location of the motor vehicle (and in particular its coordinate system) to the environment (such as a global coordinate system in a model of the environment), and in particular, with which parts of the environment it overlaps and/or which parts of the environment are currently within the field of view (i.e. overlapping, covering and/or detected in the field of view therewith). Current vehicle parameters can be drawn on for this, e.g., suspension settings that have an effect on the vertical position of the driver's compartment and/or the head-up display in relation to the roadway).

It is also possible to determine in this manner that a position of the part of the environment and/or objects in the model of the environment assigned thereto, is known, as well as the position of a field of view and/or the part of the environment that is currently detected in the field of view. As a result, it is possible to check whether or not an object this is to be currently shown, or the part of the environment assigned to this object, is located within the field of view.

In some examples, the part of the environment can be punctiform. It can define the center of a real object that is to be framed, for example, and/or serve as a type of anchor for showing instructions. The object can extend beyond a corresponding punctiform (or two-dimensional) part of the environment, and have a greater two-dimensional expansion. In this regard, it is checked whether or not the object is located entirely within the field of view when it is positioned on the part of the environment with its two-dimensional (or three-dimensional) extension. In other words, a detection of an object positioned on or in the environment is checked by the field of view.

To operate the head-up display in the specified manner, it can include a control unit in general, or be connected to such. The control unit can include at least one processor and/or at least one memory. Program instructions can be stored in the memory with which the processor causes the control unit to execute any of the steps or measures specified herein. By way of example, the control unit can obtain information relating to an assignment of at least one virtual object to a part of the environment after entering a desired route by querying a database, or from an external server. Alternatively, it can also make this assignment itself. The control unit can subsequently determine the position of a field of view in the head-up display, e.g., in the (global) coordinate system for a model of the environment (also referred to as an environment model). The (complete) imaging of the object in the field of view can subsequently be checked, and the appropriate display mode can then be selected on the basis thereof. The control unit can subsequently control the head-up display in the manner known per se to generate desired virtual displays.

In general, the virtual display in the alternative display mode can differ from a display of the object that would take place if this object were in the field of view. In particular, the display can then take place at a fixed location or region within the field of view, and/or the display can take place independently of the movement of the field of view in relation to the environment or the object, at least as long as it is not located in the field of view. In other words, in the alternative display mode, the display can take place in a fixed location within the field of view, which is not the case in the normal display mode. In the normal display mode, the position of the content that is displayed (in particular the object) also varies with the movement of the field of view in relation to the environment. The object, or its display, is preferably anchored to the part of the environment in this case, or can be regarded as having a fixed location within the environment. The opposite may be the case in the alternative display mode (fixed in place in the field of view, such that it moves in relation to the environment). Furthermore, objects can be displayed at a constant size in the alternative display mode, without relating to distances within the environment. In the normal display mode, the sized of these objects can be displayed in relation to their distances.

In some examples, the display is generated in the alternative display mode taking the type and/or content of the object into account. In particular, the display can relate to a similar or identical object that is assigned to the part of the environment. Optionally, this object assigned to the part of the environment can be scaled in size. The size also does not have to depend on the distance thereto. A type of object can be understood to be whether it is a warning, a traffic sign, in particular a speed limit sign, or navigation instructions. There are also different types or classifications of navigation instructions and/or warnings. In general, this variant also provides that, although the object is not currently within the field of view, an at least comparable (e.g., containing the same content) or an identical object is displayed.

A virtual display may be configured with a fixed location within the field of view in the alternative display mode, and can take place in particular at a fixed position or within a fixed area. By way of example, this can be at a (vertically) upper border of the field of view from the driver's perspective, or a (vertically) upper edge thereof. Displaying in this region (potentially in a special color or with special graphics) can be understood by the driver as a clear indication that the object is assigned to a part of the environment not yet currently within the field of view. In particular, the driver can understand this to mean that this refers to an upcoming object or an upcoming part of the environment that the object relates to. A display can also take place at the lower border or edge of the field of view, or some other arbitrary position within the field of view. The display preferably takes place in the middle, or at a horizontally constant position.

In general, one development provides that in the alternative display mode, the display is generated taking a position of the object assigned to the part of the environment in relation to the field of view into account. The relative position can be determined and/or defined in the (global) coordinate system for a model of the environment. By way of example, the display can take place near the edge or border of the field of view that is closest to the object in question (from the perspective of the field of view).

In some examples, a direction can be determined in this context as the relative location (or on the basis thereof) in which the object is displaced in relation to the field of view. The direction can be embodied, for example, by a two- or three-dimensional vector. In the alternative display mode, the display can be displaced in relation to the center of the field of view, in substantially the same direction. In general, the display can take place analogously to, or taking into account, the aforementioned relative location.

This can relate to the case in particular in which the relative position is a position above or below, or to the right or left, of the field of view, which are each exemplary directions of the aforementioned type. The display can then likewise take place such that a content displayed above, below, left, or right (from the perspective of the driver) is displaced in relation to the center of the field of view.

One advantage is that when the object assigned to the part of the environment does enter the field of view, and the display is switched to the normal display mode, a more natural transition takes place in the display from the perspective of the driver. By way of example, this transition is not abrupt, and/or it can take place smoothly. This is facilitated in the present case in that the object displayed in the alternative display mode (or the display taking place in general) already takes place with an awareness of the relative location of the object in the environment, and is preferably at the closest edge or corresponding border of the display. From the perspective of the driver, an object can first be displayed in the alternative display mode, which then begins to shift when the object located in the environment actually moves into the field of view, in accordance with the location in relation to this object, and begins to move successively toward the middle of the field of view. Instead of a field of view, a region of vision can also be referred to here.

The display may take place at or near an edge region of the field of view in a generally preferred variant in the alternative display mode. The edge region can be selected on the basis of the relative position of the object to the field of view explained above. Alternatively, this can be a fixed edge region (in particular the upper or lower edge).

In one example, when the object (assigned to the part of the environment) (e.g., in an initial display in particular) covers (or spans or overlaps) a portion of the field of view to a predetermined minimum extent, this object is then also at least partially displayed when it is not entirely within the field of view. In other words, the alternative display mode does not need to be activated. Alternatively, it can first be activated when the object is actually entirely outside the field of view. The object can be transparent, such that it covers the field of view, but preferably does not conceal it entirely. In other words, the object and the field of view can have a dimension along a common axis (e.g., horizontally) and the size of the object can correspond to a minimum portion of the size of the field of view.

In this variant, at least those parts of the object can be displayed, depending on a corresponding minimum size of the object, that currently overlap the field of view, or are located therein. The basis for this is that the object, due to its size, can be sufficiently noticeable from the driver's perspective, and by way of example, a partial display thereof provides the driver with enough information for it to be clearly identified. In this manner, unnecessary changes in the display mode that could potentially irritate the driver are avoided.

Alternatively or additionally, the display can move in relation to the field of view in the alternative display mode, when a temporary change takes place in the field of view in relation to the environment (e.g., along a vertical axis and/or due to a change in elevation of the motor vehicle). By way of example, the display within an environment coordinate system may remain at least temporarily in the same location, e.g., along at least two coordinate axes, in this case. This location can correspond to the location of the display in the corresponding coordinate system, before this temporary change takes place. The displayed content can therefore be fixed in place in the environment, decoupled from the field of view, such that the field of view moves in relation thereto. As a result, the object may at least partially move out of the field of view, but then resume its original position within the field of view when the vertical movement subsides. The object is then fixed in place within the field of view, or its coordinate system at the latest when this takes place, and/or it is no longer fixed in place within the environment or a global coordinate system. This display variant may be intuitive from the driver's perspective, because it reflects or absorbs the relative movement (in particular an impact-like or abrupt pitching).

In general, a temporary change in the relative location (between the field of view and the environment) can be detected on the basis of measurements by at least one acceleration sensor in the motor vehicle in the above variants. In other words, the fact that this change in the relative location is merely temporary can be determined on the basis of corresponding measurement values. If, for example, the measurements of the acceleration sensor exceed a predetermined minimum, it can be concluded that such an abrupt change is the result of driving over an obstacle. Temporal changes in the measurement values can also be regarded in order to identify vibrational patterns, or movement patterns in general, resulting from driving over elevated obstacles, such as bumps or depressions. Appropriate comparison sequences or patterns can be stored for this.

In some examples, the present disclosure also relates to a head-up display for a motor vehicle, which is designed to obtain a virtual object assigned to a (vehicle's) environment (e.g. from an external computer, e.g., a server and/or by accessing a memory or database, and/or through an independent determination or provision of such an assignment), and which can also be operated in a normal display mode when the object assigned to the environment (and positioned therein, for example) is located in a field of view for the head-up display, and which can be operated in an alternative display mode when the object assigned to the part of the environment is not, or at least not entirely, located within a field of view for the head-up display, wherein at least one virtual display can be generated in the alternative display mode.

The head up display can include any of variants or developments described above, for example, by including an aforementioned processor and/or memory. It can be configured in general to execute methods according to any of the variants specified herein. All of the above embodiments for and developments of method features can likewise relate to the features of the head-up display of the same descriptions, or be provided therein.

A driving situation for a vehicle 10 is shown in FIG. 1, where the vehicle approaches an intersection 14 along a roadway 12 in accordance with the movement arrow B. This illustration can correspond to a real driving situation. It can also be modeled in a model of the environment. The model of the environment is preferably abstract, and only defines selected properties of the environment in the indicated global (environment) coordinate system 16.

A position of the vehicle 10 and preferably a (vehicle) coordinate system 18 connected to the vehicle can be determined in this global coordinate system 16. Coordinates defined in the vehicle coordinate system 18 can be transformed into global coordinates in the global coordinate system 16 in a manner known per se. One example of coordinates defined in the vehicle coordinate system 18 are the coordinates for a head-up display 20 (also referred to below as an HUD 20). Coordinates for a field of view 21 can likewise be determined in the vehicle coordinate system 18. As indicated above, these can also be positioned in a variable manner by shifting the HUD 20. In particular, vertical and horizontal orientations of the field of view 21 can be defined by this means from the perspective of the vehicle 10 or a driver therein. The terms vertical and horizontal can refer to corresponding vertical and horizontal spatial directions, wherein the vertical axis can correspond to an axis along which the force of gravity acts. The horizontal axis can be orthogonal to the vertical axis. An optional depth axis can run along or parallel to the longitudinal axis of the vehicle.

A center MK of the intersection 14 may be defined in the global coordinate system 16 by way of example, and more precisely, its coordinates are defined therein. This center MK of the intersection is assigned a visual or graphic navigation instruction 22 (depicted by way of example as three successive arrows, see the following figures). This assignment means that the position of the navigation instruction 22, which is a virtual object in this example, defined in the global coordinate system 16. The display of this navigation instruction 22 should take place in accordance with the principles of known augmented reality HUDs from the perspective of the driver, such that it is located at the center MK of the intersection, or optically coincides therewith. The position of this center MK of the intersection can be determined in the field of view 21 for this (e.g., by comparing the global coordinates thereof), and can be shown at the corresponding position in the field of view 21, and the navigation instruction 22 can be optionally displayed in a perspective manner and/or such that its size is adapted accordingly.

Situations may occur, however, due to the circumstances described above, in which the navigation instruction 22 is not in the field of view 21 when it is positioned virtually at the center MK of the intersection, despite driving toward the intersection 14, or at least does not fully overlap this center MK. For this reason, the proposed exemplary embodiment provides for an alternative display mode, which is described below.

Figure 1A:
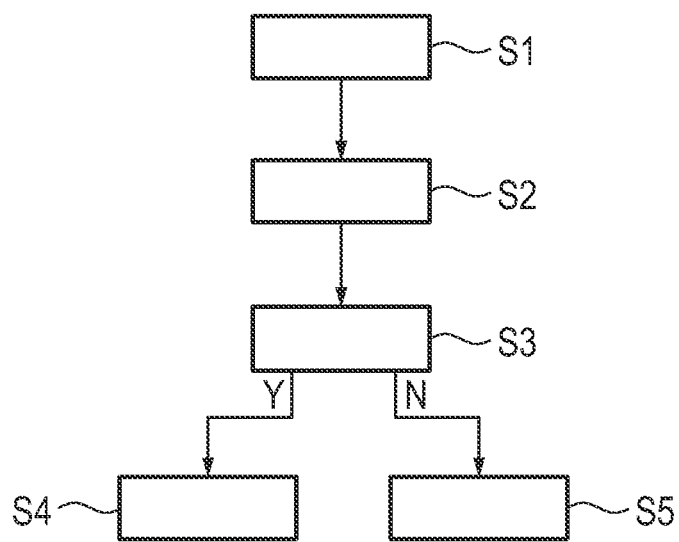
FIG. 1a shows a flow chart according to the method executed in FIG. 1 according to some aspects of the present disclosure.

The general operation of the HUD 20 shall be explained separately, once again, in reference to FIG. 1a. Information relating to an assignment of the object to be displayed in the form of a navigation instruction 22 to a part of the environment (the center MK of the intersection in this example) is obtained in step S1. Alternatively, this assignment can be carried out actively in step S1, e.g., by the HUD 20, or a control unit thereof, not shown separately. The assignment includes defining or obtaining the coordinates for the navigation instruction 22 in the global coordinate system 16.

In some examples, a position of the field of view 21 may be determined, continuously and/or repeatedly, in the global coordinate system 16 in step S2. It is then repeatedly and/or cyclically checked in step S3 whether the field of view 21 shows and/or contains the object, or navigation instruction 22, positioned at the part of the environment MK. This can be achieved by comparing the coordinates for the field of view 21 and the navigation instruction 22 in the global coordinate system 16. At this point, it should be taken into account that both the field of view 21 and the navigation instruction 22 can be two dimensional, and accordingly include, or be assigned, a two-dimensional collection of, or two dimensionally distributed, coordinates. If, for example, all of the coordinates for the navigation instruction are contained in the field of view 21, the navigation instruction 22 can be displayed entirely in the field of view 21.

If it is determined in step S3 that the navigation instruction 22 is entirely contained in the field of view 21 (arrow Y in FIG. 1a), a normal display mode is activated in step S4. The HUD 20 is then operated in the conventional manner and in accordance with augmented reality HUDs that can be obtained commercially, and the navigation instruction 22 is displayed at the position in the field of view 21 corresponding to the center MK of the intersection.

If instead, it is determined in step S3 that the navigation instruction 22 (when positioned at or assigned to the center MK of the intersection) is not entirely within the field of view 21, an alternative display mode is activated in step S5. At this point, an alternative display of the visual content to the normal display mode in step S4 takes place that is visible to the driver (such that a display other than that in the normal display mode is generated). Examples of this shall be specified below. It should be understood here that when one of the display modes in steps S4 and S5 has been established, it is preferably checked at regular intervals whether this is still valid. It is therefore possible to return to step S3 in regular intervals (e.g., after a predetermined time period has elapsed), and it is possible to check whether or not this determination remains valid. It is possible in this manner to change automatically to the currently appropriate display mode.

Exemplary displays in the field of view 21 in the alternative display mode shall be explained below in reference to FIGS. 2 to 4. These views each correspond to the perspective of the driver through the windshield of the vehicle 10 as it approaches the intersection 14 in FIG. 1. These views also each contain a field of view 21 for the HUD 20, in which it is possible to display virtual objects.

Figure 2:
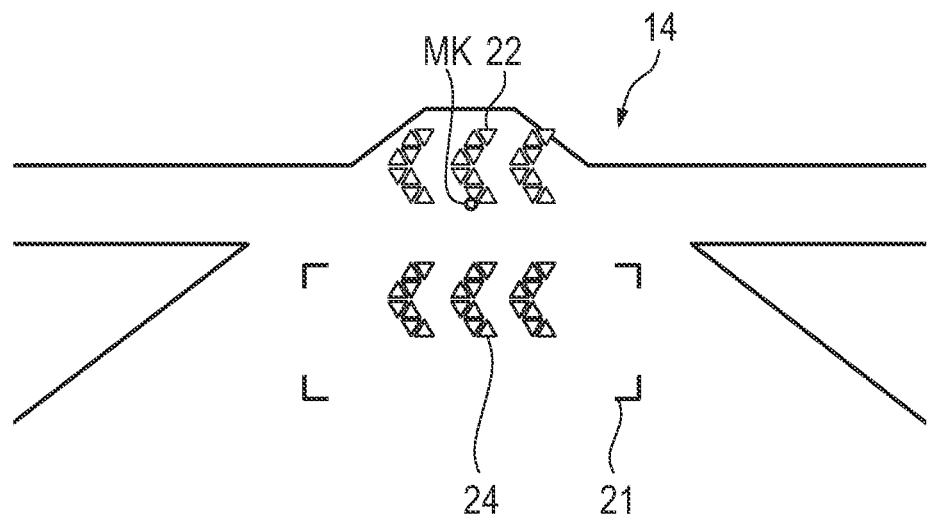
FIGS. 2 and 3 each show exemplary views that can be generated with the method in FIG. 1a according to some aspects of the present disclosure.

Both the intersection 14 and the center MK of the intersection can be seen in the example of FIG. 2. The object, or navigation instruction 22 is also shown therein, which cannot be seen by the driver, and is only shown for illustrating purposes. The two-dimensional field of view 21 can also be seen. It is clear that the navigation instruction 22 at its actual assigned position in the global coordinate system 16 (see FIG. 1) in the center MK of the intersection does not lie in the field of view 21. Instead, it lies above the field of view 21 from the perspective of the vehicle coordinate system 18. Optionally, this relative position is determined in a separate step (e.g., within the alternative display mode), e.g., that the object in its state assigned to the part of the environment lies above or below (as described below in reference to FIG. 3), the field of view 21. Accordingly, the object 24 (the alternative object 24 below) is then also displayed in the field of view 21 based on this relative position. In this example, this is shown such that the alternative object 24 is displayed at the upper edge or upper border of the field of view 21. In other words, the alternative object 24 is therefore shown off-center. It is displaced vertically upward above the middle of the field of view 21, since the center MK of the virtual object 22 that is to be displayed on the part of the environment is also positioned above the field of view 21.

Merely by way of example, the alternative object 24 in these cases is an object of the same type and content as the actual object, or the actual navigation instruction, that is to be displayed.

Figure 3:
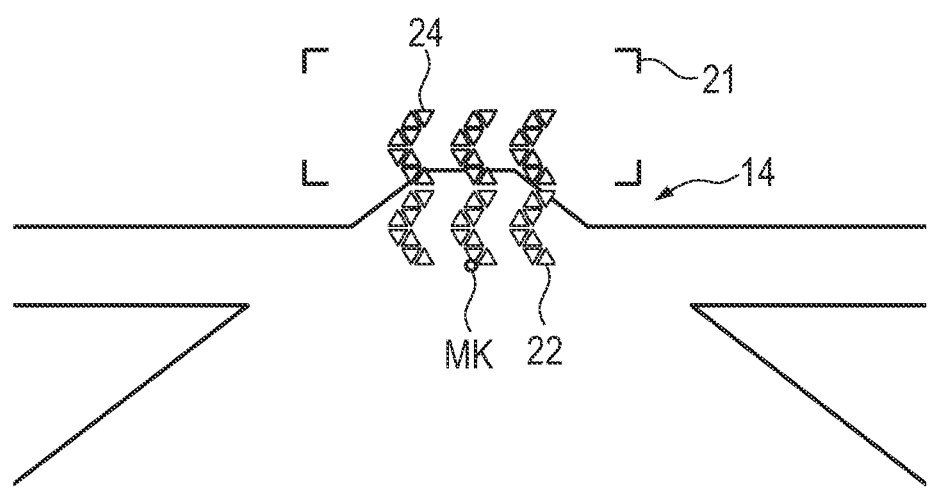

FIG. 3 shows an example in which the field of view 21 lies above the center MK of the intersection (e.g., due to a selected driver setting), and in particular the navigation instruction 22 positioned there. The alternative object 24 is accordingly placed at the lower edge of the field of view 21, in acknowledgment of this optionally separately determined relative position.

In general, the optional determination of the relative position can be limited to the determination of a vertical relative position, for example, to whether the field of view 21 is positioned at least partially above or below the navigation instruction 22, if the latter is positioned at the part of the environment, or center MK of the intersection.

Figure 4:
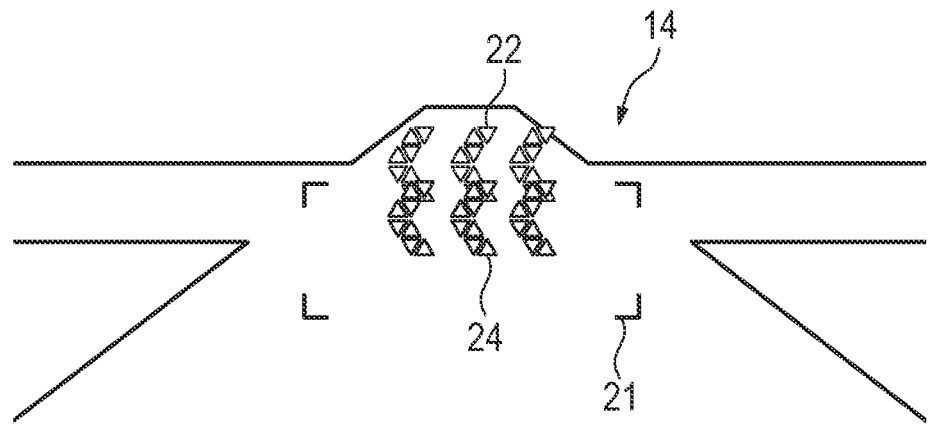
FIG. 4 shows a view that can be generated with the method in FIG. 1a, when an object assigned to a part of the environment is only located in part in a field of view according to some aspects of the present disclosure.

FIG. 4 shows an example where the field of view 21 at least partially contains the navigation instruction 22 (when it is positioned at the center MK of the intersection, concealing it here). Most of the navigation instruction 22 remains above the field of view 21 in this illustration, although the lower part of its three arrows extends into the field of view 21. The alternative object 24 is preferably also displayed in accordance with the relative position in this case (at the upper edge of the field of view 21 here), and none of the components of the actual navigation instruction 22 that is to be shown are displayed at their intended position (the center MK of the intersection). Instead, the latter can first take place when the field of view 21 is moved further upward in relation to the navigation instruction 22, e.g., when approaching the center MK of the intersection. In other words, the field of view 21 increasingly overlaps the navigation instruction 22 as the vehicle approaches the intersection 14, and the navigation instruction moves down into the field of view 21. As soon as it is in the field of view 21, the normal display mode can be activated. In some examples, the initially generated display, or view, then corresponds to that in FIG. 4, such that it coincides with the navigation instruction 22 at the upper edge of the field of view 21. From the perspective of the driver, this results in a smooth transition between the two display modes, that is preferably imperceptible to the driver.

Figure 5:
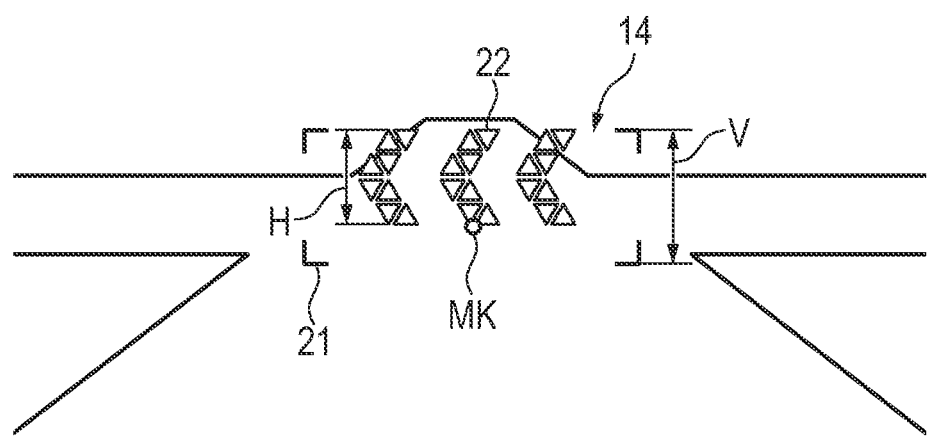
FIGS. 5-7 show views of a virtual object in a field of view in various operating conditions and when satisfying a defined size criterion for the object in relation to the field of view according to some aspects of the present disclosure.

FIG. 5 shows a situation in which a navigation instruction 22 is displayed in its entirety at its actual intended position (the center MK of the intersection) in the field of view 21. This example corresponds to a normal display mode, in which the navigation instructions 22 is contained entirely in the field of view 21.

This also illustrates an example in which the navigation instruction 22 covers at least a predefined dimension V of the field of view 21 to defined minimum extent, or extends along this dimension to a defined minimum extent. This relates in the present case to a vertical dimension of the field of view 21, by way of example. A corresponding vertical height H of the navigation instruction 22 can assumed at least 50%, preferably 60% of the corresponding vertical dimension V of the field of view 21.

Figure 6:
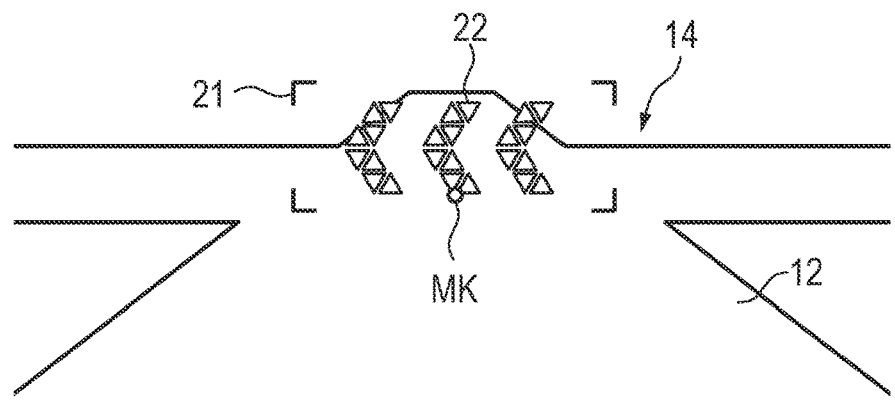

If the driver continues to approach the intersection 14 in FIG. 5, the object or navigation instruction 22 assigned to a specific location in the environment then remains at this location from the perspective of the driver, i.e. at the center MK of the intersection. Consequently, the navigation instruction moves toward the lower edge of the field of view 21, as can be seen in FIG. 6. Because of the size ratio described above for the navigation instruction 22 to the field of view 21, as the vehicle continues to approach the intersection 14, and the navigation instruction 22 moves downward, out of the field of view 21, it is not necessary to switch directly to the alternative display mode. This can first take place when the navigation instruction 22 lies entirely out of the field of view.

Figure 7:
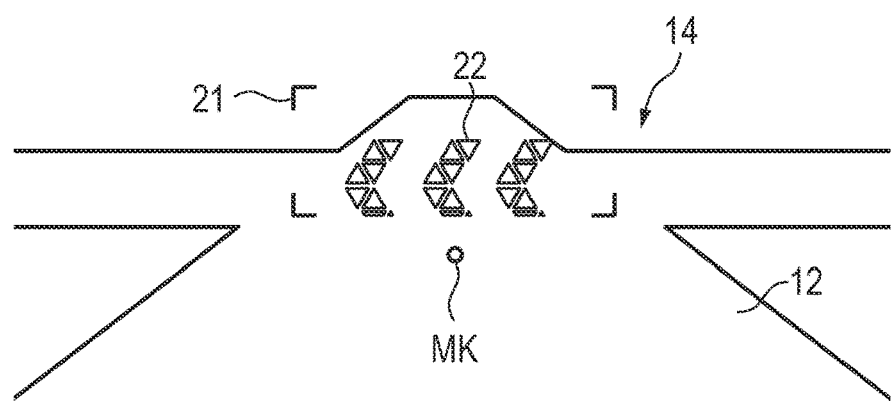

Instead, those parts of the navigation instruction 22 that continue to overlap the field of view 21, or are contained therein, can still be shown in the field of view 21. The navigation instruction 22 is therefore cut off, so to speak, as the parts extending out of the field of view are not shown separately. This is shown in FIG. 7. Because of the size ratio explained above, the navigation instruction 22 can still be seen clearly by the driver at this point.

The situation shown in FIG. 7 can also occur when the vehicle 10 moves vertically in relation to the road surface in FIG. 6, e.g., when passing over a bump or depression (such as a vertical obstacle). These types of vertical movement are normally abrupt, usually in the form of subsiding vibrations. The field of view 21 then teeters up and down with a dampened amplitude in relation to the roadway 12, moving up and down in relation thereto. Starting with the normal display mode in FIG. 6, in particular when the size ratio described above is satisfied, but preferably independently thereof, the display is not immediately changed to the alternative display mode due to the temporary motion of the field of view 21 in relation to the roadway 12, and thus also to the center MK of the intersection. Instead, at least partially cut-off views can be generated, as shown in FIG. 7, even with navigation instructions that do not satisfy the size ratio described above, when the field of view 21 is moved abruptly up or down, starting from the position shown in FIG. 6 (see the corresponding state shown in FIG. 7). The recognition of the temporary character of a corresponding relative motion of the field of view 21 in relation to the environment, and in particular to the center MK of the intersection, can take place with acceleration sensors 19 (see FIG. 1) for a suspension system in the vehicle 10 in particular.

Figure 8:
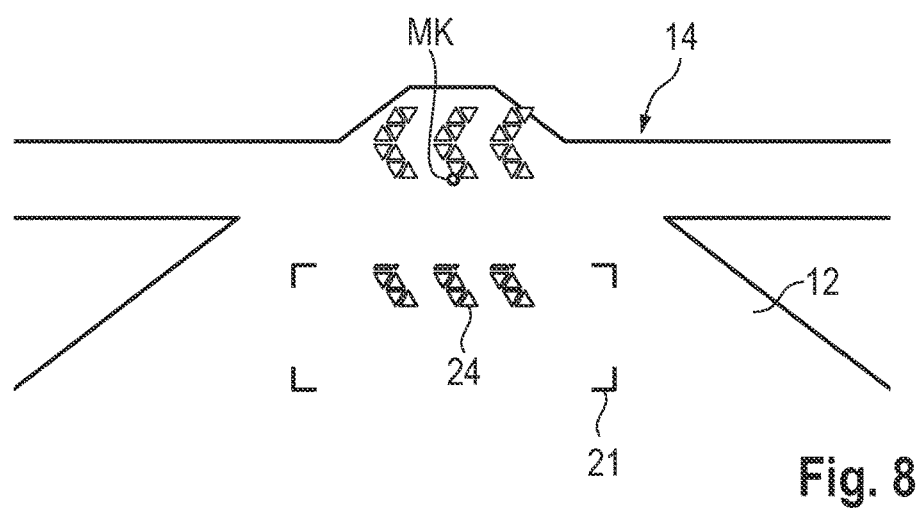
FIG. 8 shows a schematic view of a field of view analogous to that in FIGS. 2 to 7, when the vehicle is temporarily elevated according to some aspects of the present disclosure.

FIG. 8 shows a display that may occur when the alternative display mode is activated and the temporary relative motion of the field of view to the environment described above takes place, in particular due to a vertical movement of the vehicle 10. In this case, the initial situation can correspond to that in FIG. 2, e.g., with a flat road surface 12. Starting from this situation, if the vehicle passes over a depression, the field of view 21 may slip downward in relation to the environment, and in particular the center MK of the intersection.

Because of the temporary aspect of this relative movement, the alternative display element 24 is not moved down along with the field of view 21, in order to avoid irritating the driver. It therefore does not remain fixed in place within the field of view 21 (e.g., fixed in place in relation to a center of the field of view 21, which is not specifically indicated in the drawing). Instead, it preferably remains fixed in place in relation to the environment and/or the center MK of the intersection. Furthermore, preferably only that part of the alternative display element 24 is displayed that still overlaps the field of view 21. In this case, this is the lower part of the three arrows (e.g., in comparison to the illustration in FIG. 2).

When the field of view 21 moves back up as the vehicle 10 returns to its normal position in FIG. 8, the alternative display element 24 can be moved back down in the field of view 21. The alternative object 24 can reassume its fixed position in the field of view 21 once it fully returns to the field of view 21 and/or the vertical movement has abated, or the field of view 21 has returned to the original relative position to the environment. It then no longer has a fixed relationship to the center MK of the intersection, and can therefore move in relation thereto.

LIST OF REFERENCE SYMBOLS 10 vehicle
12 roadway
14 intersection
16 global (environment) coordinate system
18 vehicle coordinate system
19 acceleration sensor
20 head-up display (HUD)
21 field of view
22 virtual object (navigation instruction)
24 virtual display in alternative display mode (alternative object)
MK part of environment (center of intersection)
B direction of movement of the vehicle
H vertical height of the object
V vertical dimension of the field of view

The invention claimed is:

1. A method for operating a head-up display for a vehicle, comprising:
    obtaining an assignment of at least one virtual object that can be displayed to a part of a display environment;
    activating a first display mode for the head-up display when the virtual object assigned to the part of the display environment is within a field of view for the head-up display;
    activating an alternate display mode for the head-up display when the object assigned to the part of the environment is at least partially not contained within the field of view for the head-up display, wherein the alternative display mode comprises generating a virtual display; and
    detecting a temporary change in the position of the field of view relative to the display environment, and moving the virtual display relative to the field of view.

2. The method of claim 1, wherein activating the alternative display mode comprises activating the alternative display mode based on a type and/or content of the virtual object.

3. The method of claim 1, wherein activating the alternative display mode comprises activating the alternative display mode based on a relative position of the virtual object assigned to the part of the display environment and the field of view.

4. The method of claim 1, wherein activating the alternative display mode comprises offsetting the display environment relative to a center of the field of view, based on a relative position of the object to the field of view.

5. The method of claim 1, wherein activating the alternative display mode comprises generating the display environment in or near an edge of the field of view.

6. The method of claim 1, further comprising at least partially displaying the at least one virtual object when the at least one virtual object overlaps a dimension of the field of view and is not entirely within the field of view.

7. The method of claim 1, further comprising, after activating the first display mode:
    detecting a temporary change in the relative position of the field of view of the display environment;
    detecting that the virtual object temporarily and at least partially exits the field of view; and
    maintaining activation of the first display mode, and not activating the alternate display mode.

8. The method of claim 1, further comprising scaling a size of the virtual object assigned to the part of the display environment.

9. The method of claim 1, wherein detecting the temporary change comprises detecting a relative position of the vehicle based on values from at least one acceleration sensor.

10. A system for a vehicle, comprising:
a heads-up display; and
a processing apparatus, operatively coupled to the heads-up display, wherein the heads-up display and processing apparatus are configured to
  obtain an assignment of at least one virtual object that can be displayed to a part of a display environment;
  activate a first display mode for the head-up display when the virtual object assigned to the part of the display environment is within a field of view for the head-up display;
  activate an alternate display mode for the head-up display when the object assigned to the part of the environment is at least partially not contained within the field of view for the head-up display, wherein the alternative display mode comprises generating a virtual display; and
  detect a temporary change in the position of the field of view relative to the display environment, and move the virtual display relative to the field of view.

11. The system of claim 10, wherein the heads-up display and processing apparatus are configured to activate the alternative display mode by activating the alternative display mode based on a type and/or content of the virtual object.

12. The system of claim 10, wherein the heads-up display and processing apparatus are configured to activate the alternative display mode by activating the alternative display mode based on a relative position of the virtual object assigned to the part of the environment and the field of view.

13. The system of claim 10, wherein the heads-up display and processing apparatus are configured to activate the alternative display mode by offsetting the display environment relative to a center of the field of view, based on a relative position of the object to the field of view.

14. The system of claim 10, wherein the heads-up display and processing apparatus are configured to activate the alternative display mode by generating the display environment in or near an edge of the field of view.

15. The system of claim 10, wherein the heads-up display and processing apparatus are configured to at least partially display the at least one virtual object when the at least one virtual object overlaps a dimension of the field of view and is not entirely within the field of view.

16. The system of claim 10, wherein the heads-up display and processing apparatus are configured to, after activating the first display mode:
  detect a temporary change in the relative position of the field of view of the display environment;
  detect that the virtual object temporarily and at least partially exits the field of view; and
  maintain activation of the first display mode, and not activating the alternate display mode.

17. The system of claim 10, further comprising sealing a size of the virtual object assigned to the part of the display environment.

18. The system of claim 10, further comprising at least one acceleration sensor, operatively coupled to the processing apparatus, wherein the processing apparatus is configured to detect the temporary change by detecting a relative position of the vehicle based on values from the at least one acceleration sensor.

19. A method for operating a head-up display for a vehicle, comprising:
  obtaining an assignment of at least one virtual object that can be displayed to a part of a display environment;
  activating a first display mode for the head-up display when the virtual object assigned to the part of the display environment is within a field of view for the head-up display;
  activating an alternate display mode for the head-up display when the object assigned to the part of the environment is at least partially not contained within the field of view for the head-up display, wherein the alternative display mode comprises generating a virtual display; and
  detecting a temporary change in the position of the field of view relative to the display environment, and moving the virtual display relative to the field of view,
  wherein activating the alternative display mode comprises one of (i) activating the alternative display mode based on a type and/or content of the virtual object, (ii) activating the alternative display mode based on a relative position of the virtual object assigned to the part of the display environment and the field of view, and (iii) offsetting the display environment relative to a center of the field of view, based on a relative position of the object to the field of view.

* * * * *